May 6, 1947. C. WULSTEIN 2,420,277
COMBINED HANDLE AND HANGER
Filed April 25, 1944
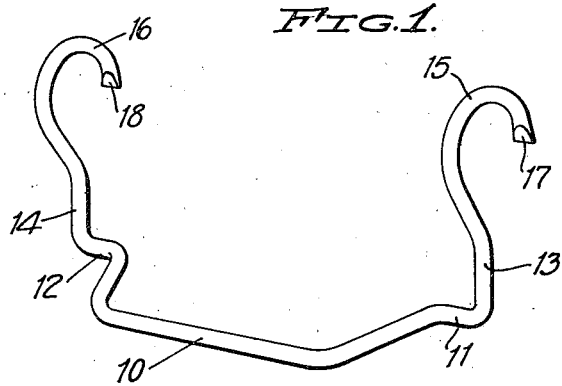
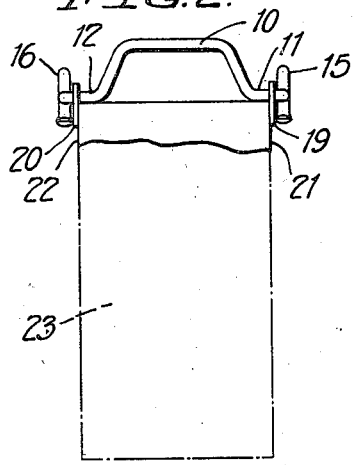
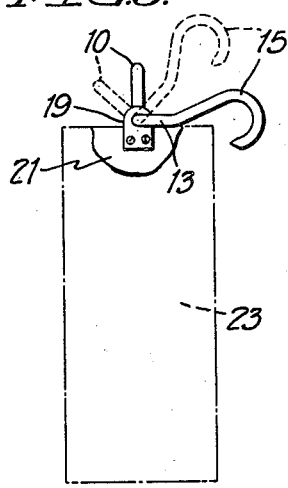
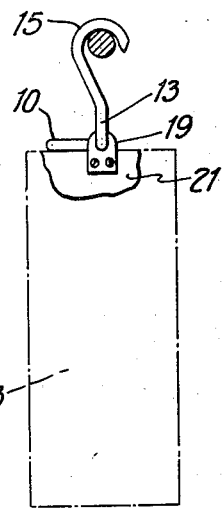
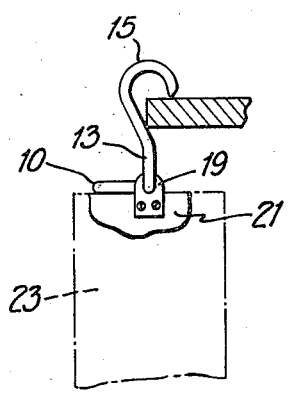
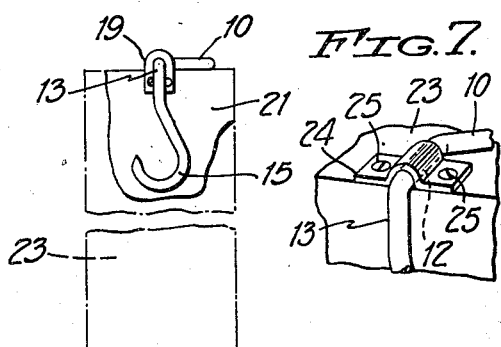
INVENTOR
CHARLES WULSTEIN
BY Knight
ATTORNEYS Patented May 6, 1947

2,420,277

UNITED STATES PATENT OFFICE 2,420,277

COMBINED HANDLE AND HANGER

Charles Wulstein, New York, N. Y., assignor to himself and Murray Gordon, New York, N. Y.

Application April 25, 1944, Serial No. 532,687

1 Claim. (Cl. 220—95)

The present invention relates to a combined hanger and carrying handle for portable containers or housings of various types, intended to be hung in a suspended position for storage or when in use.

This application for patent is a continuation-in-part of my pending application Serial No. 474,925, filed on February 6, 1943, in which the combined handle and hanger is illustrated in connection with a portable testing unit for the electrical equipment of automotive vehicles.

Carrying handles for portable containers are commonly made in the form of a bale hinged to the top of the container, so as to lie flat against the top when not in use and thus economize space. On the other hand, certain types of containers are advantageously hung or suspended in vertical position either for storage or for use, or both. Thus, electric meters and similar testing instruments, for example, are very often much more convenient and accessible for use in making tests when they are hung where they can be readily reached and observed by the operator. When collapsible hooks are employed, to economize space, they may be quite awkward to apply to the support from which the instrument is to be suspended.

According to my invention, I provide a carrier and hanger construction in which two open hooks project rigidly from a hinged carrying handle or bale so that the carrying handle not only is useful in carrying the container or receptacle but enables the operator to manipulate and guide the open hooks in applying them to the supporting object such as a rod, pipe, ledge or other supporting medium. The parts are so proportioned that the open hooks are spaced apart sufficiently to enable them to clear the top of the container and swing downward close to the sides when the bale is raised and swung to the limit of its path in one direction, and will be raised above the container top as the bale is raised and swung to the limit of its path in the other direction. The angular relation of the hooks to the bale is preferably such that the hooks will lie entirely below the top of the container when the bale is in one extreme position flat against the container top, and will be approximately upright above the plane of the container top when the bale rests in its other extreme position against the container top. In this latter position, the bale abutting against the container top constitutes a brace to prevent movement of the hook members past their approximately vertical position and assist in stabilizing the container against undue freedom of swinging motion in the one direction. Between that extreme position of the bale and a directly upright position thereof, the hook openings are designed to be sufficiently above the top surface of the container to permit the application of the hooks to the supporting surface from the container is to be suspended.

As a matter of practical construction, I prefer to form the combined hanger and carrying handle from a single length of stock such as for example metal wire, rod or bar. In bending or otherwise forming the article, the intermediate portion is offset in a plane, or preferably so, to form the bale, short lengths of the stock immediately adjacent thereto are left in alinement with each other to serve as journalling portions or axles, and the terminal portions of the stock beyond such journalling portions are bent upward into planes at least approximately parallel to each other and then curved into the shape of open hooks preferably remaining in said parallel planes, the openings of the hooks being directed away from the bale portion of the article.

A typical example of the invention and illustrations of its use are shown in the accompanying drawing, in which—

Figure 1 is a perspective view of the combined handle and hanger with the parts shown in the general position assumed when it is serving as a hanger.

Figure 2 is a front elevation of the combined handle and hanger pivotally mounted on a container, the parts being shown in the position in which the device serves as a carrying handle.

Figure 3 is a side view of the same with the device shown in broken lines in a position in which it may be held by the user in the act of applying the hook members to a supporting element.

Figure 4 is a side view illustrating the hook members engaging a supporting rod.

Figure 5 is a view similar to Figure 4, illustrating the hook members engaging a supporting plate or shelf.

Figure 6 is a side elevation illustrating the combined handle and hanger pivotally swung into a position in which the hook members are disposed in a downward position alongside the sides of the container and the handle member is resting flat on the top of the container, as would occur when the container is resting on an underneath support, and Figure 7 is a fragmentary detail in perspective showing the use of an alternative type of bearing member.

As illustrated in Figure 1, the device may be constructed of a single length of stock, for example rod or bar, the bale portion 10 being offset in one plane from the alined journalling portions 11, 12 from which rise the shanks 13, 14 of the open hooks 15, 16, constituting the terminal portions of the stock. The extreme ends of the hook portions 15, 16 may be bevelled as shown at 17, 18 to enable the ends of the hooks to enter narrow spaces or to enable the hooks to more securely engage a supporting surface with which they may contact in suspending the container. The journalling portions 11, 12 may be fitted freely within the bearing apertures of the bearing lugs or ears 19, 20 (Figures 2 to 6) which are illustrated as being in the present instance secured by screws to the sides 21, 22 of a container conventionally illustrated at 23. Here, it may be observed, the hook portions 15, 16 lie in approximately parallel planes spaced apart sufficiently to clear the sides 21, 22 of the container when the bale portion 10 is raised to carrying position or thrown toward the hooks into one of its extreme positions lying in contact with the top of the container. Examples of these positions are illustrated in full lines in Figures 2, 3 and 6. The broken lines in Figure 3 illustrate the hook and bale in an intermediate position in which the bale may be gripped or held by the user in applying the open hook members to the supporting object. Figures 4 and 5 show the extreme raised or upright position of the hook members supporting the container 23 from a round rod in Figure 4 and a supporting ledge in Figure 5. In these supporting positions of the hook members, the bale 10 lies flat against the top of the container 23, thus steadying the suspended load against undue freedom of swinging motion and enabling the user to apply a pushing force to the hooks by gripping the container in one or both hands. In the position shown in Figure 6, the hook portions and bale portion are disposed close against the sides and top respectively of the container, thus economizing space. This position of the parts obviously corresponds to a condition in which the container is resting by gravity upon a floor, shelf or other underneath support.

From an observation of the various figures of the drawing, it will be apparent that the shank or axis of the hook portions should be disposed in a plane approximately 90° from the plane of the bale portion, to perform the functions intended. At the same time, it will be equally obvious that this precise angular relationship is not rigidly necessary as all of the functions required can be performed over quite a range of angular relationship between the hook and bale portions.

In the modification shown in Figure 7, bearing plates 24 are substituted for the bearing lugs or ears 19, 20 and are secured on the top of the container 23 by screws 25, the bearing portions of the plates 24 confining beneath them the journalling portions 11, 12 of the combined handle and hanger.

I claim:

The combination with a portable container, of a combined carrying handle and suspension hanger therefor, comprising a length of stock having an intermediate portion offset to constitute a carrying bale, journalling portions coaxially alined with each other at the respective ends of said carrying bale and terminal portions upturned substantially 90° from the plane of said carrying bale and formed as open suspension hooks disposed in substantially parallel planes substantially perpendicular to the common axis of said journalling portions and in spaced apart relation to each other so as to swing free of the container and at substantially a 90° angle to the plane of the carrying bale portion, and a pair of bearing members for hingedly connecting said journalling portions to the upper portion of said container, said carrying bale portion being of sufficiently restricted dimensions to abut against the upper surface of the container and thus limit the range of the swinging movement of said suspension hooks, but otherwise free to swing through a range of substantially 180°.

CHARLES WULSTEIN.

REFERENCES CITED

The following references are of record in the file of this patent:

UNITED STATES PATENTS

| Number | Name | Date |
|---|---|---|
| 1,159,552 | Truxell | Nov. 9, 1915 |
| 1,710,318 | Marter | Apr. 23, 1929 |
| 1,772,392 | Firl | Aug. 5, 1930 |
| 1,119,235 | Brandle | Dec. 1, 1914 |
| 697,472 | Giessel | Apr. 15, 1902 |
| 1,441,518 | Molthan | Jan. 9, 1923 |
| 1,026,096 | Lawrence | May 14, 1912 |